United States Patent Office 3,067,502
Patented Dec. 11, 1962

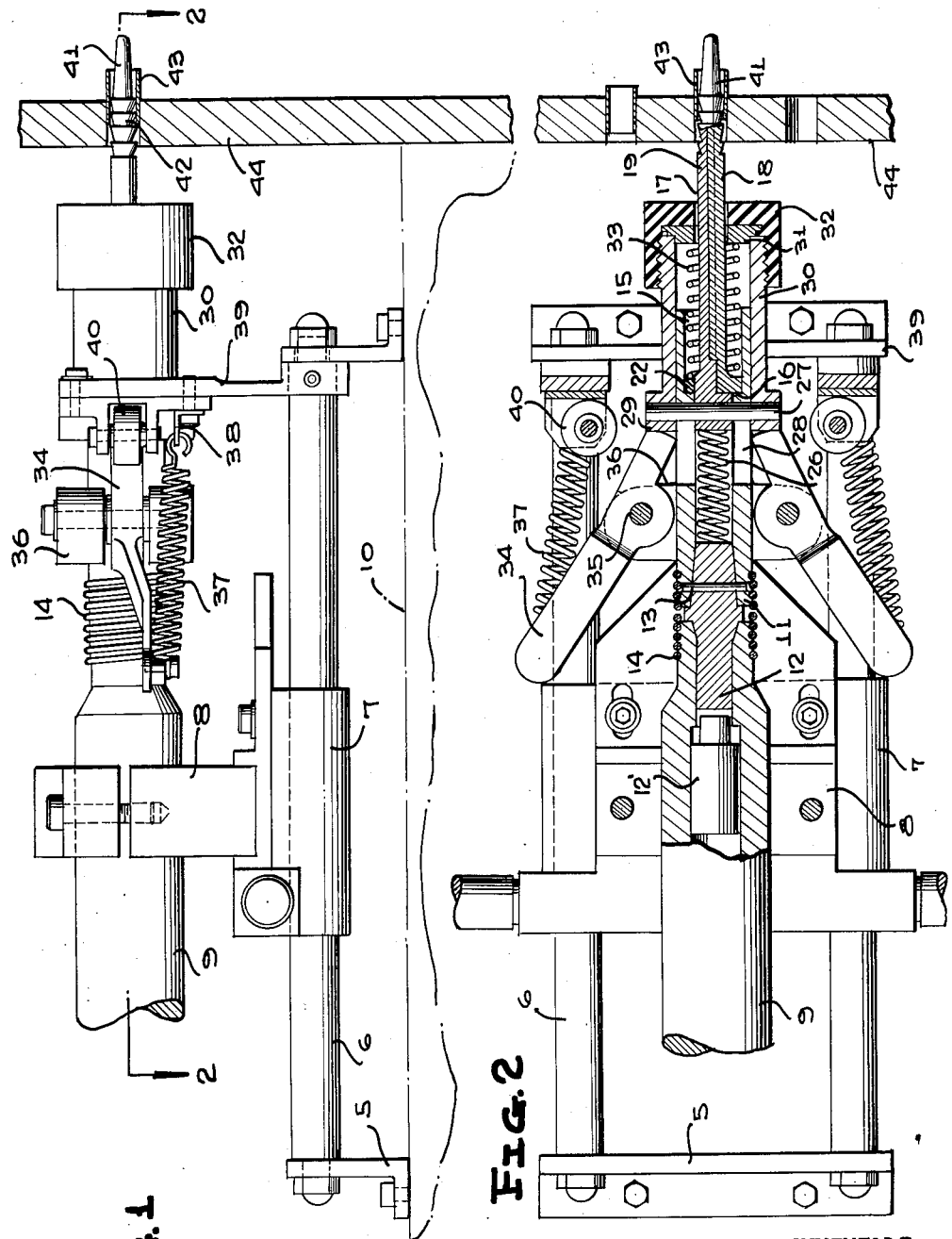

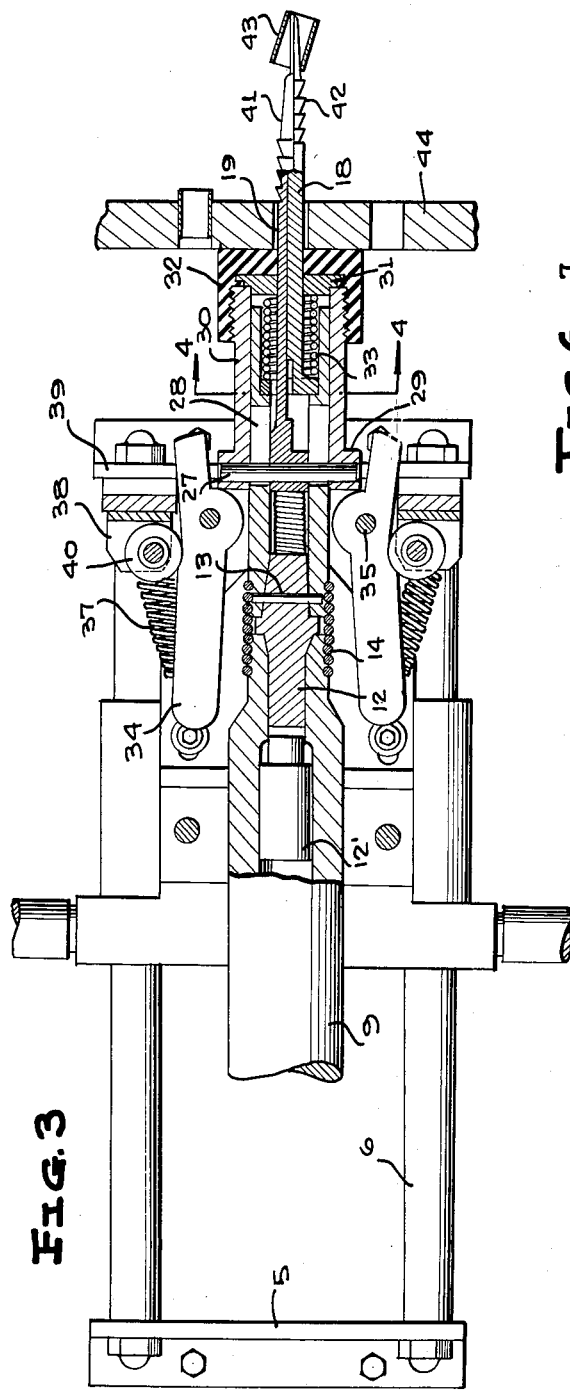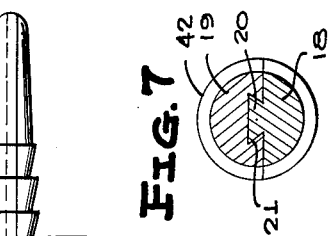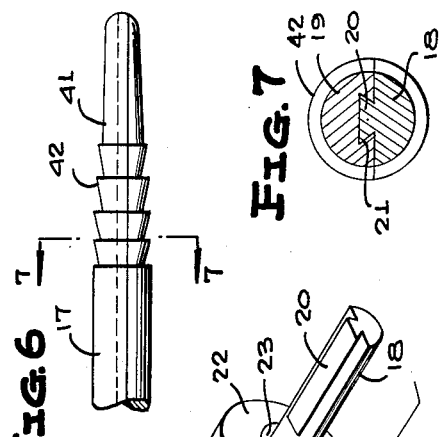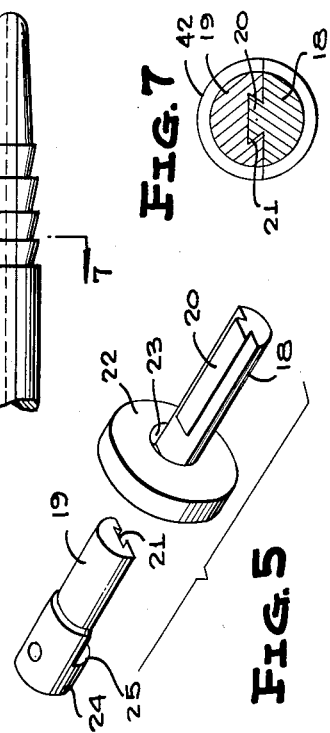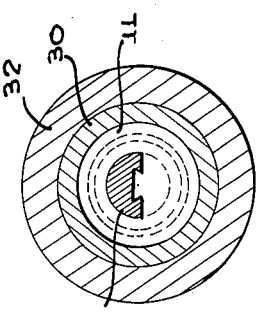

3,067,502
TOOL FOR REMOVING FERRULES
Seth J. Wheatley, Rte. 3, Clinton, Tenn., and Harry Weatherly Reynolds, Fountain City, Tenn. (5508 Dogwood Road, Knoxville 18, Tenn.)
Filed Oct. 20, 1960, Ser. No. 63,857
4 Claims. (Cl. 29—255)

This invention relates to a tool for removing ferrules or tube stubs from a tube sheet or for performing other types of work on the interior of a sleeve or pipe.

It is an object of the invention to provide a tool for the removal of ferrules or tube stubs from a tube sheet having a plunger adapted to be driven into gripping engagement with the ferrule or tube stub, the plunger being composed of correlative movable sections whereby one section may be driven independently of the other section to strip the ferrule from the other section after removal of the ferrule from the tube sheet.

A further object of the invention resides in providing a plunger divided longitudinally to provide independently movable sections slidably connected together, the end of said plunger being tapered and provided with a plurality of cutting edges of graduated diameter.

A still further object of the invention resides in providing a plunger divided longitudinally to provide independently movable sections slidably connected together and means for driving the plunger operable to drive one section of the plunger independently of the other section.

A still further object of the invention resides in a tool having a reciprocating plunger divided longitudinally into independently movable sections and a reciprocating drive shaft having means for independently driving the sections of the plunger forward operable to disconnect the drive means of one section while the other section moves forward.

Other objects and advantages of the invention will be apparent during the course of the following description.

In the accompanying drawings, forming a part of this specification and in which like numerals are employed to designate like parts throughout the same, FIG. 1 is a side elevational view of the tool,
FIG. 2 is a sectional view taken on line 2—2 of FIG. 1.
FIG. 3 is a view similar to FIG. 2 showing the tool in advanced position,
FIG. 4 is a cross section taken on line 4—4 of FIG. 3,
FIG. 5 is a fragmentary perspective view of the plunger sections in separate relation,
FIG. 6 is a detail view of the cutting edges on the end of the plunger, and
FIG. 7 is a cross section taken on line 7—7 of FIG. 6.

In the drawings wherein for the purpose of illustration a preferred embodiment of the invention is shown, the numeral 5 denotes a pair of brackets for supporting parallel track rods 6 which slidably support a carriage 7 having a bearing block 8 for removably mounting a cylinder 9 of a conventional pneumatic gun. The brackets 5 are mounted on a suitable table or base 10 which may be mounted for vertical and horizontal adjustment to aline the tool with the work. Connection between the cylinder 9 and tubular drive shaft 11 of the tool is established by a connecting rod 12 having its ends inserted in the bore of the cylinder and bore of the drive shaft and vibratory impacts of a reciprocating piston 12' against the end of the connecting rod are transmitted by the connecting rod to the drive shaft. A transverse pin 13 fixedly secures the end of the connecting rod to the drive shaft and the adjacent ends of the cylinder and drive shaft are provided with exterior threads to receive a spring type coupling 14 whereby the drive shaft of the tool is detachably connected to the pneumatic gun. The forward end of drive shaft 11 is provided with an enlarged bore 15 forming a shoulder 16 and slidably mounted in the bore is a cylindrical plunger 17. The plunger 17 is divided longitudinally parallel to its axis to form sections 18 and 19 so that the strength of each section is approximately equal. The two sections of the plunger are slidably connected together by a longitudinal beveled tongue and groove 20 and 21 formed on the confronting faces of the sections. An annular flange 22 is formed integral with the rear end of section 18 for slidable mounting in the enlarged bore 15 of the drive shaft and is limited in its rearward movement by shoulder 16. The flange 22 has a semi-circular aperture 23 therethrough for passage of the section 19 of the plunger to permit free sliding movement of the section 19 along the section 18. A cylindrical head 24 is formed integral with the rear end of section 19 which is slidable in the smaller bore of the drive shaft, and the forward movement of the section 19 is limited by a shoulder 25 formed on the head which abuts the flange 22 of the section 18. The section 19 is normally held in a forward position by an expansion spring 26 disposed between the head 24 and forward end of connecting rod 12. A pin 27 extends transversely through the head 24 and opposed longitudinal slots 28 formed in the drive shaft with its ends fixedly mounted in a flange 29 formed on the rear end of a sleeve 30 slidably mounted on drive shaft 11. The forward end of sleeve 30 is closed by a retainer disk 31 held thereon by an annular resilient bumper cap 32 threaded on the end of the sleeve. The disk 31 and cap 32 are provided with central apertures for passage of the plunger 17 therethrough. A compression spring 33 is mounted on the plunger with its ends in bearing engagement with disk 31 and flange 22 and normally holds the flange against the shoulder 16.

The sleeve 30 is normally held in a forward position by a pair of rock levers 34 pivotally mounted intermediate their ends, as at 35, in lugs 36 on opposite sides of the drive shaft at the rear ends of slots 28. The levers extend longitudinally of the drive shaft with their forward ends normally engaged with flange 29 of sleeve 30. The rear ends of levers 34 are connected to one end of coil springs 37 having their opposite ends connected to brackets 38 attached to standards 39 extending upwardly from the forward ends of track rods 6. The springs exert a constant pull on the levers to hold the forward ends of the levers in engagement with flange 29. Mounted on the standards 39 are cam rollers 40 which upon forward movement of the drive shaft engage the rear ends of the rock levers 34 to rock the levers and disengage the forward ends from engagement with flange 29 thereby permitting the drive shaft to move forwardly independently of the sleeve 30.

The forward end of plunger 17 is tapered, as at 41, having a plurality of tapered broach-like cutting edges 42 formed thereon which are of decreasing diameter towards the nose of the tapered end. The number of cutting edges and the angle of the taper may vary depending on the type of work to be performed. The tapered end of the plunger is adapted to be inserted in a ferrule 43 that is to be removed from a tube sheet 44 with the cutting edges in contact with the inner wall of the ferrule.

In use, the tool is positioned with the plunger 17 in alinement with the ferrule 43 and the tapered end 41 inserted in the ferrule. Upon actuation of the pneumatic gun vibratory impacts are imparted through connecting rod 12 to drive shaft 11 and through rock levers 34 and pin 27 to the head 24 thus driving the plunger forward. The tool is advanced forwardly by any suitable means as the plunger drives the ferrule from the tube sheet, whereupon the cam rollers 40 contact the rear ends of rock levers 34 to disengage the levers from engagement with flange 29 so that the drive shaft is free to move independently of sleeve 30. When the rock levers are released the bumper cap 32 is in engagement with the tube sheet and prevents forward movement of the sleeve 30 thus holding the section 19 of the plunger from further advancement while the drive shaft continues to move the section 18 forwardly thus stripping the ferrule from the end of section 19. When the ferrule is stripped from the section 19 it is loosely retained on the end of the section 18 until the tool is withdrawn whereupon it is easily dislodged from the end of section 18. When the bumper cap 32 engages the tube sheet the springs 26 and 33 are compressed and upon withdrawal of the tool the expansion of the springs will return the sleeve 30 to its normal position, in which position it is held by the rock levers 34 which are moved into engagement with flange 29 by springs 37.

While the tool has been described for use in the removal of ferrules from a tube sheet it is apparent the same may be employed for use in cleaning, filing, polishing or sizing the inside diameter of a pipe or opening and for various other types of work obvious to those skilled in the art. Also in place of a pneumatic gun the tool may be actuated by hydraulic or other suitable means for producing the vibratory impacts or other suitable forces. Various means for withdrawing one section of the plunger independently of the other section may be employed.

Having thus described our invention, we claim:

1. A tool of the character described comprising a plunger having cutting edges at one end, said plunger being divided longitudinally to provide independently movable sections, the confronting faces of said sections having a longitudinal tongue and groove connection slidably connecting the sections together, impact means having constant driving connection with one section of said plunger and means for establishing releasable driving connection between said impact means and the other section of said plunger.

2. A tool of the character described comprising a plunger having cutting edges at one end, said plunger being divided longitudinally to provide independently movable sections with the confronting faces of said sections having a longitudinal tongue and groove connection slidably connecting the sections together, one section having an enlarged head and the other section having a flange surrounding the first section normally in contact with said enlarged head, impact means having constant driving connection with the flange of said other section, and means establishing releasable driving connection between said impact means and the enlarged head of said first section.

3. A tool of the character described comprising a tubular drive shaft, impact means for driving said shaft longitudinally, a plunger slidably mounted in said drive shaft having cutting edges at one end, said plunger being divided longitudinally to provide independently movable sections, one of said sections having constant driving connection with said drive shaft, a sleeve slidably mounted on said drive shaft having connection with the other section of said plunger, rock levers carried by said drive shaft having engagement with said sleeve to establish connection between the drive shaft and sleeve, and means for engagement with said rock levers to release the levers from engagement with said sleeve.

4. A tool of the character described comprising a tubular drive shaft, impact means for driving said shaft longitudinally, a plunger slidably mounted in said drive shaft having cutting edges at one end, said plunger being divided longitudinally with one section having an enlarged head and the other section having an annular flange surrounding said first section and in contact with the enlarged head, means establishing driving connection between said drive shaft and the annular flange of said other section, a sleeve slidably mounted on said drive shaft, means establishing connection between said sleeve and the enlarged head of said first section, rock levers pivotally mounted on said drive shaft for engagement with the end of said sleeve, yieldable means normally holding said levers in engagement with said sleeve, and means for engagement with said rock levers to release said levers from engagement with said sleeve when said drive shaft has moved forward a predetermined distance.

References Cited in the file of this patent

UNITED STATES PATENTS

| | | |
|---|---|---|
| 832,364 | Burton | Oct. 2, 1906 |
| 945,874 | Thompson | Jan. 11, 1910 |
| 1,474,073 | Dlesk | Nov. 13, 1923 |
| 1,504,650 | Smith | Aug. 12, 1924 |
| 1,544,246 | Leslie | June 30, 1925 |
| 1,905,496 | Peo | Apr. 25, 1933 |
| 2,731,714 | Dudley | Jan. 24, 1956 |
| 2,947,074 | Newman | Aug. 2, 1960 |
| 2,950,525 | Duncan et al. | Aug. 30, 1960 |